April 20, 1954   J. D. HIRSCH ET AL   2,676,300
VACUUM TUBE VOLTMETER
Filed Dec. 6, 1951
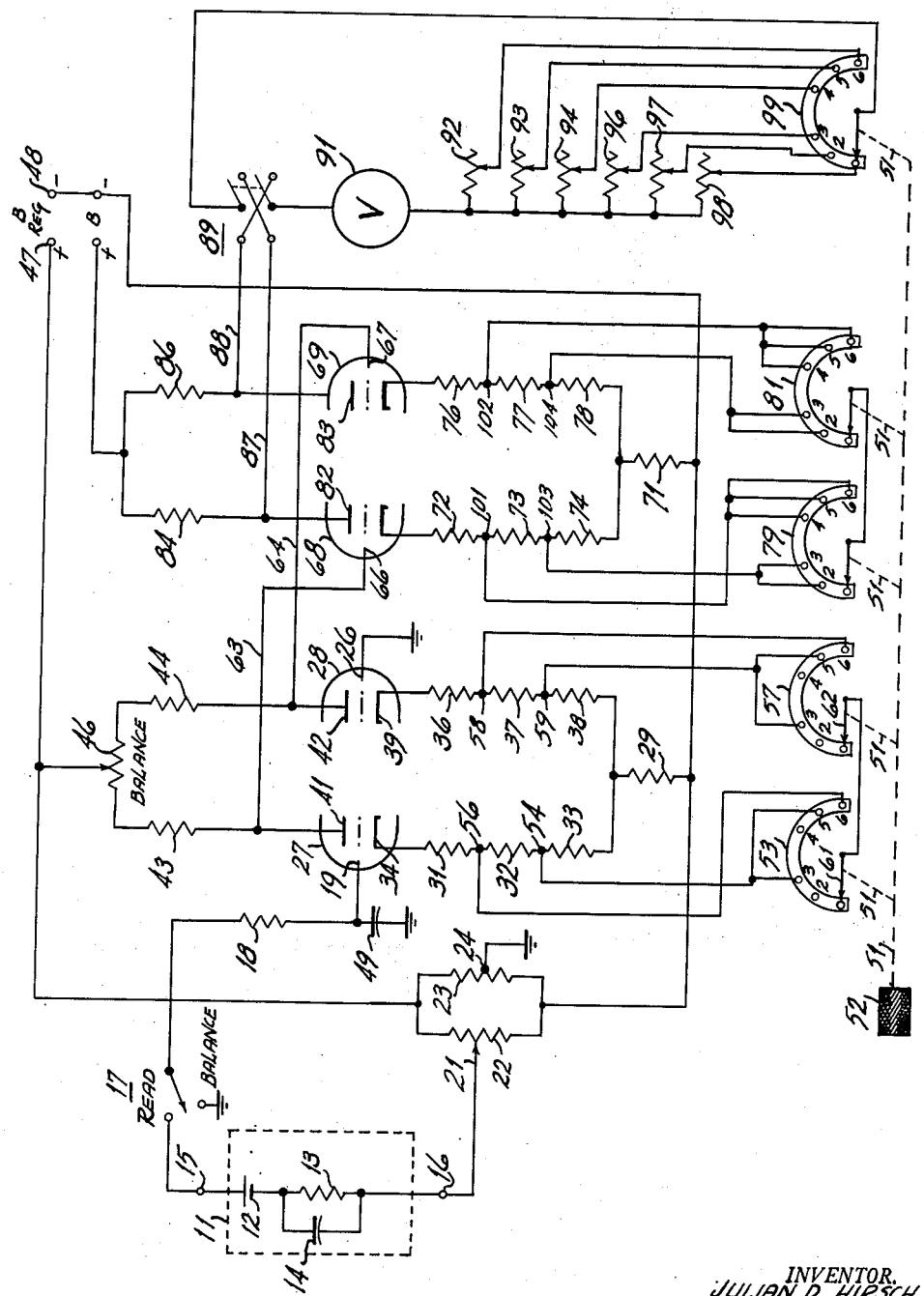
INVENTOR.
JULIAN D. HIRSCH
RAYMOND L. GARMAN
BY
*H. L. Mackey*
ATTORNEY.

Patented Apr. 20, 1954

2,676,300

UNITED STATES PATENT OFFICE 2,676,300

VACUUM TUBE VOLTMETER

Julian D. Hirsch, Mount Vernon, and Raymond L. Garman, Pleasantville, N. Y., assignors to General Precision Laboratory Incorporated, a corporation of New York Application December 6, 1951, Serial No. 260,134

8 Claims. (Cl. 324—98)

This invention pertains to voltmeters of the vacuum tube type and particularly to meters for measuring low direct-current voltages involved in chemical measurements such as indication of titration end-points and the determination of hydrogen ion concentration.

Such a voltmeter is preferably multi-range and must have adequate linearity of the output indication with varying magnitude of input signal. The voltmeter should also have high input impedance, good stability of sensitivity, low zero drift, and be relatively unaffected by variations in line voltage.

The voltmeter of the invention has these characteristics and in addition is capable of measuring input voltages of either polarity. It has convenient provision for calibration in terms of standard buffer solutions. Its principal characteristic, however, resides in the fact that it is provided with a degenerative feedback circuit which is varied to vary the gain, and thus in varying the gain the concomitant change of feedback varies the linearity of the amplifier inversely to the gain. This is an advantage in the use of this voltmeter for pH determination, because it results in the more important scales being made the most linear.

The principal purpose of this invention is to provide an improved vacuum tube voltmeter for measuring solution electrode potentials including glass electrode potentials.

A detailed understanding of the invention may be secured by reference to the following description and the accompanying drawing in which the single figure constitutes a schematic diagram of the vacuum tube voltmeter circuit of the invention.

Referring now to the single figure, an input signal generating device is indicated at 11. This device may be of any nature which generates a low, non-varying direct-current voltage, such as, for instance, a cell for the measurement of hydrogen ion concentration. Such a cell is employed as example and is here represented schematically by a source of voltage 12 in series with a high resistance 13, the latter being shunted by a condenser 14. The output of the source of voltage 12 has the magnitude of a fraction of a volt and the internal resistance 13 may be as high as 500 megohms or more, with an average value, when a glass electrode is employed, of 250 megohms.

The signal generating device 11 is connected to two instrument terminals 15 and 16, terminal 15 being connected through a balancing switch 17 and a resistor 18 to the input control grid 19 of the first electronic amplification stage. The switch 17 is provided to permit a preliminary adjustment of the instrument before making a measurement and the resistor 18 is provided to protect the instrument from the effect of unduly high input voltage. The resistor 18 may have a value of 10 megohms for this purpose, such a value being so much lower than that of the input impedance of the instrument as to have only a negligible effect on accuracy. Terminal 16 is returned to the slider 21 of a voltage divider 22 which is connected across a source of direct-current potential. The voltage divider 22 is shunted by a resistor 23 having a grounded midtap 24, so that the slider 21 may be placed either at ground potential or above or below it.

The first electronic stage of amplification is a direct-coupled differential stage employing a single-ended input to a floating grid 19, the other grid 26 being grounded. The tube employed is the two-section triode having the type number 5692, being especially designed by the manufacturer for precision applications. The tube sections are medium mu triodes and are characterized by having very low grid current. In addition, it has been discovered that one of the two triode sections in this type of tube is invariably characterized by much lower grid current than the other and this triode section, having element connections to base pins 4, 5 and 6, is accordingly the section 27 employed for application of the input signal.

The other section 28 is connected thereto in the conventional manner employing a common cathode resistor 29 so that differential or push-pull output is secured. In addition to the common cathode resistor 29, each tube section is provided with an individual cathode resistor divided into three sections, the resistor sections 31, 32 and 33 being connected in series and to the cathode 34 of tube section 27 while the resistor sections 36, 37 and 38, having resistances equal to those of the corresponding resistors 31, 32 and 33, are connected in series and to the cathode 39 of tube section 28. The two anodes 41 and 42 of this stage are connected through respective anode resistors 43 and 44, and through a voltage divider 46 provided for initial balance adjustment, to the positive terminal 47 of a regulated source of constant potential. The negative terminal 48 thereof is connected to the common cathode resistor 29, completing the anode circuits of both tube sections of the first amplifying stage. The input control grid 19 is grounded for alternating current by means of a condenser 49 of moderate size, such as .005 mf., to reduce the effect upon the amplifier of alternating voltages which may accidentally be introduced ahead of this grid by any possible means, such as by induction from 60-cycle lines.

The resistance in each tube section circuit is made fairly highly to increase the tube internal resistance and reduce the grid current. A satisfactory value for each anode resistor has been found to be ½ megohm, with a similar value for the total cathode resistance. The stage gain is reduced to about 22 db when these resistance values are employed.

That part of the cathode circuit which is individual to each tube section produces degeneration because it is common to both the anode and the grid circuit of the particular tube section and varies in current and voltage drop with change of signal. For example, the resistors 31, 32, 33 and 29 are or may be in the cathode-anode circuit of tube section 27, and the same resistors plus part of the voltage divider 22 are in the cathode-grid circuit. Upon change of anode current only the voltage drop across the resistors 31, 32, and 33 varies, and it varies in such direction as, through its influence on grid bias, to oppose the change of anode current. This constitutes degenerative feedback and has three principal effects; in promoting stability of sensitivity, promoting linearity, that is, the proportionality of output change to input change, and in reducing gain. By stability of sensitivity is meant the day-to-day constancy of the instrument output indication for a given constant input signal. Stability and linearity are both quite good in such a circuit even without degeneration. The addition of the degeneration improves the circuit to the point where stability and linearity deviations are scarcely measurable.

A switch is provided for short-circuiting the two lower sections of each of the individual cathode resistors so as to change the amount of degeneration and thereby to change the amount of gain of the stage.

A 5-bank dial switch is provided for changing the amount of individual resistance in each tube section cathode circuit while maintaining constant the total cathode resistance, including that individual to the section and that common to the two sections in the stage. This switch has six positions and is operated by a shaft, represented by the dashed lines 51, and a knob 52. One bank 53 of this switch is associated with the tube section 27, its switch contacts 3 and 5 being connected to the junction 54 of the cathode resistors 32 and 33 and the contact 6 being connected to the junction 56 of the cathode resistors 31 and 32. The switch contacts 1, 2, and 4 are left unconnected. Another bank 57 is connected in a similar manner to the cathode resistors 36, 37 and 38, at their junctions 58 and 59, in the circuit of the tube section 28, and the arms 61 and 62 of the switch banks 53 and 57 are connected together.

When the switch is on contact 1, 2, or 4, all of the individual cathode resistors are in circuit to produce the maximum degenerative effect and the minimum gain. When the switch is on contact 3 or 5, however, connection is thereby made between junctions 54 and 59, so that resistors 33 and 38 paralleled are added to the common resistor 29, and only the resistors 31 and 32 remain as cathode resistors individual to the section 27. Resistors 36 and 37 similarly remain as the only cathode resistors individual to the section 28. When the switch is on contact 6, the connection is transferred to connect junction 56 to junction 58, and only the resistors 31 and 36 remain as individual resistors. The gain is then maximum for this stage.

As a specific example, if the resistors 31 and 36 each have 2000 ohms resistance, and the resistor 29 has 470,000 ohms resistance, then with the slider switch arms 61 and 62 placed on switch contact 6, the amount of degeneration is negligible because the resistances of resistors 31 and 36 are negligibly small by comparison with that of resistor 29. The gain of the stage is then approximately 22 db as stated. If the resistors 32 and 37 are of 70,000 ohms resistance each, then with the switch arms on contact 3 or 5 the degeneration is increased so that the gain is approximately 14½ db, or 7½ db less than before, and the transfer linearity has been improved. If the switch arms be moved to contacts 1, 2 or 4, and the resistors 33 and 38 are each of 30,000 ohms, the degeneration is further increased, reducing the gain by 1½ db to 13 db and increasing the linearity still more.

The output of the first stage is taken from the anodes 41 and 42 through conductors 63 and 64, which are directly connected to the control grids 66 and 67, respectively, of the second stage. This stage is composed of the tube sections 68 and 69, coupled together by means of a common cathode resistor 71. Each tube section has an individual three-section cathode resistor, indicated by the reference numerals 72, 73, 74, 76, 77, and 78, and a switch represented by the dial switch banks 79 and 81 which is provided to switch one, two or three resistor sections into the circuit of each tube section. The anodes 82 and 83 are connected to a source of positive potential through individual resistors 84 and 86. Output is taken from the anodes 82 and 83 through conductors 87 and 88.

The output conductors 87 and 88 are connected through a polarity-reversing switch 89 to a multi-scale meter 91 which reads full-scale with current of 300 ma. Six 5000-ohm rheostats 92, 93, 94, 96, 97 and 98, under control of the fifth switch bank 99, are placed in series with the meter to permit individual scale calibration.

The 5-bank, 6 contact switch permits change of amplifier gain and concurrently of scale indication in six steps, the meter 91 being provided with six scales likewise numbered 1 to 6. The first contact and step provides the lowest gain and highest meter voltage scale. When the switch is positioned at this step the switch banks 53, 57, 79 and 81 are all in open-circuited condition and the meter-adjusting rheostat 98 is in series with the meter 91. When the switch is at its 6th position the junctions 56 and 58 are connected together, the junctions 101 and 102 are connected together, and the rheostat 92 is in circuit with the meter 91. When the switch is at the other positions designated 2, 3, 4, or 5, the banks are at the corresponding switch contacts so that the gains and scale designations are progressively varied in accordance with the following table of scales.

| Scale No. | pH concentration or Input Voltage for Full-Scale Indication | 1st stage resistor junctions connected | 2nd stage resistor junction connected |
| --- | --- | --- | --- |
| 1 | 1½ volts | none | none |
| 2 | 885 mv. or 15 pH | none | 103–104 |
| 3 | 750 mv | 54–59 | 103–104 |
| 4 | 443 mv. or 7.5 pH | none | 101–102 |
| 5 | 375 mv | 54–59 | 101–102 |
| 6 | 150 mv | 56–58 | 101–102 |

The scale number is marked beside each switch contact in the drawing in accordance with this table.

In order to prepare the circuit for operation, the switch 17 is placed on the grounded tap marked "Ballance," and the potentiometer 46 is adjusted until the meter 91 reads zero. The grid 19 is then at the ground potential of the grid 26 and the differential output voltage between the output conductors 63 and 64 is nominally zero. Actually, however, the differential output voltage of the first stage may differ from zero by such an amount which is sufficient to impose such a potential on the second stage as is required to compensate for balance therein. In this manner the necessity for any separate provision of balance adjustment located with the second stage itself is obviated.

The switch 17 is then moved to "Read," and the input terminals 15 and 16 are short-circuited. The potentiometer 22 is then adjusted until the meter again reads zero. The slider 21 is then obviously at a point corresponding to the ground tap 24 on the bridging resistor 23, so that ground potential is applied to the grid 19.

The function of this potentiometer 22 is to balance out unwanted voltages in the input signal. For instance, if in preparation for a hydrogen ion determination it is desired to standardize the equipment by the employement of a standard buffer solution having a pH of 4, the terminals 15 and 16 are connected to a glass electrode and a calomel electrode, and these electrodes are immersed in the standard solution. The scale switch is placed on tap 4 so that full-scale meter reading is nominally 7.5 pH. The meter indication will then be, for this solution, about 4 on this scale, and the voltage divider slider 21 is adjusted until the indication is exactly 4. This operation balances out all asymmetry potentials in the input circuit so that, when the unknown solution is substituted for the standard buffer solution, the pH thereof will be indicated by the meter with exactness. If the instrument is employed to measure voltages of ordinary sources other than solution electrodes, the potentiometer 22 and the resistor 23 can be omitted entirely and the terminal 16 connected directly to ground.

In each tube section the cathode sets itself approximately 2½ volts above the grid potential, this action being automatic and dependent upon the anode supply voltage and anode circuit resistance as is well known. Since with the type of tube employed this negative grid bias of 2½ volts is several volts above cutoff, the point of operation is on a relatively straight part of the tube characteristic curve. This grid bias varies only very slightly over the entire range of input voltage of ¾ volt, therefore, operation never departs from the straight part of the characteristic curve. It is therefore evident that positive and negative input voltages are amplified with equal facility and accuracy.

In order to permit the use of a direct-current meter as an indicator, such meters being inherently more accurate than alternating-current meters, and at the same time permitting the measurement of input signals of either polarity, the reversing switch 89 is provided to reverse the meter polarity to agree with the polarity of signals applied to the meter.

It is obvious that all parts of the input circuit from the terminal 15 to the input grid 19 connection terminal should be carefully designed to prevent leakage, employing techinques that are well understood in the art, so as to preserve the very high input impedance of which this instrument is capable. It is advantageous, for instance, to cover all insulating parts of the input circuit with an insulating grease to reduce surface conductance. A high input impedance is of importance because the more it exceeds the signal input circuit impedance the greater may the sensitivity and accuracy of the intrument be made.

What is claimed is:

1. A multirange vacuum tube voltmeter comprising, at least one amplifying stage including a pair of tube sections each of which includes at least an anode, cathode and control grid, circuit means for applying a signal to the grid cathode circuit of each of said tube sections, a first series of resistors connected in the cathode circuit of one of said tube sections, a second series of resistors connected in the cathode circuit of the other of said tube sections, the terminals of said first and second series of resistors remote from the respective cathodes being connected together and to a terminal of reference potential, switch contacts connected to the junctures of the several resistors forming said first and second series of resistors, switch means selectively interconnecting respective switch contacts of said first and second series of resistors to vary the gain of said amplifier stage by varying the amount of regeneration applied thereto, a meter, and circuit means interconnecting said meter and the anode circuits of said pair of tube sections.

2. A multirange vacuum tube voltmeter comprising, at least one amplifying stage including a pair of tube sections each of which includes at least an anode, cathode and control grid, circuit means for impressing a signal to be measured between the control electrode of one tube section and ground, the control electrode of the other of said pair of tube sections being grounded, a first series of resistors connected in the cathode circuit of one of said tube sections, a second series of resistors connected in the cathode circuit of the other of said tube sections, the terminals of said first and second series of resistors remote from the respective cathodes being connected together and to a terminal of reference potential with respect to ground through a common resistor, the junctures between said several resistors constituting said first and second resistors being connected to selected switch contacts, switch means selectively interconnecting respective switch contacts of said first and second series of resistors to vary the gain of said amplifier stage by varying the amount of regeneration applied thereto, a meter, and circuit means interconnecting said meter and the anode circuits of said pair of tube sections.

3. A multirange vacuum tube voltmeter as defined in claim 2 in which the anodes of said tube sections are connected together through a resistor and anode potential is supplied to said tube sections through an adjustable contact on said resistor.

4. A multirange vacuum tube voltmeter comprising, an amplifier containing a pair of amplifier stages each of which includes a pair of tube sections, means for impressing a signal to be measured on the input circuit of one amplifier stage, each of said tube sections having a plurality of resistors connected in series in their respective cathode circuits, the terminals of said series resistors of each of said pair of tube sections remote from the cathodes thereof being connected together and each interconnected pair of series resistors being connected to a source of reference potential as respects ground through resistors individual to each pair, switch means for each of said amplifier stages for bridging corresponding terminals of the series resistors of each pair of tube sections, the anodes of the tube sections of said one amplifier stage being connected to the control electrodes of the tube sections of the other amplifier stage, and an indicator connected to the anode circuits of the other amplifier stage.

5. A multirange vacuum tube voltmeter as defined in claim 4 in which the anodes of said tube sections forming said one amplifier stage are connected together through a resistor and anode potential is supplied to said tube sections through an adjustable contact on said resistor.

6. A multirange vacuum tube voltmeter comprising, a first amplifying stage including a pair of tube sections, each of said tube sections having a plurality of resistors individual thereto connected in series in their respective cathode circuits, the terminal of each of said series resistors remote from the respective cathodes being connected to a source of reference potential through a common resistor, switch means for bridging corresponding terminals on said series resistors, an input circuit having one terminal grounded and a second terminal connected to the control electrode of one of said tube sections, the control grid of the other of said tube sections being connected to ground, a second amplifying stage including a second pair of tube sections, each of said second pair of tube sections having a plurality of resistors individual thereto connected in series in their respective cathode circuits, the terminals of each of said last named series resistors remote from the respective cathodes being connected to a source of reference potential as respects ground through a common resistor, switch means for bridging corresponding terminals of said last mentioned series resistors, said first and second mentioned switch means being actuated by a common control means operative to vary the relative terminals bridged in said first and second amplifier stages, circuit means connecting respective anode circuits said tube sections of said first amplifier stage with respective control electrode of said tube sections of said second amplifier stage, and an indicator connected between the anodes of the tube sections of said second amplifier stage.

7. A multirange vacuum tube voltmeter as defined in claim 6 in which the anodes of the tube sections of said first amplifier stage are connected together through a resistor and anode potential is supplied to said tube sections through an adjustable contact of said resistor.

8. A multirange vacuum tube voltmeter comprising, an amplifier stage including a pair of tube sections, means for impressing an input signal thereon, resistive means in the cathode circuit of each of said tube sections forming individual degenerative feedback circuits therefor, a common cathode circuit for said tube sections connected in series with said individual degenerative feedback circuits, means for transferring selected amounts of the resistive means of each of said individual degenerative feedback circuits to said common cathode circuit, and indicator means coupled to the output of said amplifier stage.

References Cited in the file of this patent

UNITED STATES PATENTS

| Number | Name | Date |
|---|---|---|
| 2,212,337 | Brewer | Aug. 20, 1940 |
| 2,273,432 | Brewer | Feb. 17, 1942 |
| 2,369,066 | Maxwell | Feb. 6, 1945 |
| 2,443,864 | MacAuley | June 22, 1948 |
| 2,523,240 | Vackar | Sept. 9, 1950 |
| 2,538,539 | Stokes | Jan. 16, 1951 |
| 2,561,597 | Rogers | July 24, 1951 |

FOREIGN PATENTS

| Number | Country | Date |
|---|---|---|
| 112,068 | Australia | Dec. 19, 1940 |

OTHER REFERENCES

Publication—Radio-Electronics, pp. 30–32, vol. XXII, Issue 12, pub. date September 1951. In Class 171-95-7.

Publication—Electronics, pp. 127–129, February 1945. In Class 171-95-22.